(12) United States Patent
Ahuja et al.

(10) Patent No.: US 8,739,030 B2
(45) Date of Patent: May 27, 2014

(54) PROVIDING A QUOTE TEMPLATE IN A MULTI-TENANT DATABASE SYSTEM ENVIRONMENT

(75) Inventors: Neeraj Ahuja, Fremont, CA (US); Zhou Zhou, Superior, CO (US); Ceren Sakizli, San Francisco, CA (US); Tyler Ziemann, San Francisco, CA (US); Gene Rivera, San Francisco, CA (US); Charandeep Tatlah, Union City, CA (US); Geri Rebstock, San Francisco, CA (US); Evan Moses, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 4 days.

(21) Appl. No.: 12/985,313

(22) Filed: Jan. 5, 2011

(65) Prior Publication Data

US 2011/0296298 A1     Dec. 1, 2011

Related U.S. Application Data

(60) Provisional application No. 61/349,709, filed on May 28, 2010, provisional application No. 61/312,617, filed on Mar. 10, 2010.

(51) Int. Cl.
*G06F 17/00* (2006.01)
(52) U.S. Cl.
USPC .......................................... 715/255; 715/200
(58) Field of Classification Search
USPC .......................................... 715/200, 255, 273
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Aleskerov et al., Cardwatch: A Neural Network Based Database Mining System for Credit Card Fraud Dectection, IEEE 1997, pp. 220-226.*

(Continued)

*Primary Examiner* — Cong-Lac Huynh
(74) *Attorney, Agent, or Firm* — Ingrassia Fisher & Lorenz, P.C.

(57) ABSTRACT

In a method, system, and computer-readable medium having instructions for providing a quote template in a multi-tenant database system, information on a selection of a first database object is received for use in creation of a document template, representations for one or more database fields related to the first database object are displayed on a user interface and a database field related to the first database object has a database field of the first database object or a second database object related to the first database object and a representation of the database field may be selected on a layout for one or more documents that can be created with the document template, information is received on the layout of a document to be created with the document template and the layout of the document template has one or more selected database fields related to the first database object, and rendering information is generated for the document with information on the layout in the document template in a target format.

23 Claims, 8 Drawing Sheets

(56) References Cited

U.S. PATENT DOCUMENTS

| | | | |
|---|---|---|---|
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,035,298 | A * | 3/2000 | McKearney ............... 1/1 |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,701,308 | B1 * | 3/2004 | Chen et al. ............... 715/200 |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,127,670 | B2 * | 10/2006 | Bendik ............... 715/200 |
| 7,340,411 | B2 | 3/2008 | Cook |
| 7,401,094 | B1 | 7/2008 | Kesler |
| 7,505,999 | B2 * | 3/2009 | Gee et al. ............... 1/1 |
| 7,511,845 | B2 * | 3/2009 | Inikori ............... 358/1.15 |
| 7,620,655 | B2 | 11/2009 | Larsson et al. |
| 7,647,553 | B2 * | 1/2010 | Mogilevsky et al. ............... 715/247 |
| 7,698,160 | B2 | 4/2010 | Beaven et al. |
| 7,802,175 | B2 * | 9/2010 | Wagner et al. ............... 715/200 |
| 7,810,027 | B2 * | 10/2010 | Bendik ............... 715/255 |
| 8,056,005 | B2 * | 11/2011 | Giannetti ............... 715/248 |
| 8,060,815 | B2 * | 11/2011 | Voslow ............... 715/201 |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,112,445 | B2 * | 2/2012 | Weissman et al. ............... 707/790 |
| 8,144,345 | B2 * | 3/2012 | Nishikawa ............... 358/1.13 |
| 8,156,416 | B2 * | 4/2012 | St. Jacques et al. ............... 715/200 |
| 8,204,949 | B1 * | 6/2012 | Krajec ............... 709/206 |
| 8,275,836 | B2 | 9/2012 | Beaven et al. |
| 8,332,743 | B2 * | 12/2012 | Miyazawa ............... 715/230 |
| 8,341,232 | B2 * | 12/2012 | Rashad et al. ............... 709/206 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0116417 | A1 * | 8/2002 | Weinberg et al. ............... 707/517 |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2003/0228011 | A1 * | 12/2003 | Gibson ............... 379/211.02 |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0036719 | A1 * | 2/2004 | Van Treeck ............... 345/763 |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0199876 | A1 * | 10/2004 | Ethier et al. ............... 715/523 |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0166139 | A1 * | 7/2005 | Pittman et al. ............... 715/511 |
| 2005/0229092 | A1 * | 10/2005 | Hull et al. ............... 715/500 |
| 2005/0251742 | A1 * | 11/2005 | Mogilevsky et al. ............... 715/521 |
| 2006/0026274 | A1 * | 2/2006 | Cho et al. ............... 709/223 |
| 2006/0066905 | A1 * | 3/2006 | Takashima et al. ............... 358/1.18 |
| 2006/0156226 | A1 * | 7/2006 | Dejean et al. ............... 715/517 |
| 2007/0027749 | A1 | 2/2007 | Peiro et al. ............... 705/14 |
| 2007/0130103 | A1 | 6/2007 | Malone et al. ............... 707/1 |
| 2008/0040367 | A1 * | 2/2008 | Bitonti et al. ............... 707/101 |
| 2008/0049258 | A1 * | 2/2008 | Moyo et al. ............... 358/3.28 |
| 2008/0091707 | A1 * | 4/2008 | Brown et al. ............... 707/102 |
| 2008/0104493 | A1 * | 5/2008 | Rees et al. ............... 715/200 |
| 2009/0006936 | A1 * | 1/2009 | Parker et al. ............... 715/200 |
| 2009/0024912 | A1 * | 1/2009 | McCabe et al. ............... 715/224 |
| 2009/0235158 | A1 * | 9/2009 | Rosenstein et al. ............... 715/234 |
| 2010/0228376 | A1 * | 9/2010 | Stafford et al. ............... 700/110 |
| 2011/0078260 | A1 * | 3/2011 | Rashad et al. ............... 709/206 |
| 2011/0161178 | A1 * | 6/2011 | Rosenstein et al. ............... 705/14.69 |

(56) References Cited

U.S. PATENT DOCUMENTS

| | | | | |
|---|---|---|---|---|
| 2011/0283182 | A1* | 11/2011 | Miller et al. | 715/235 |
| 2012/0041791 | A1* | 2/2012 | Gervais et al. | 705/4 |
| 2012/0089562 | A1* | 4/2012 | Deremigio et al. | 707/602 |
| 2012/0131426 | A1* | 5/2012 | Oyarzabal et al. | 715/200 |
| 2012/0226658 | A1* | 9/2012 | Connor | 707/609 |
| 2013/0055078 | A1* | 2/2013 | Berger et al. | 715/273 |
| 2013/0080548 | A1* | 3/2013 | Krajec | 709/206 |

OTHER PUBLICATIONS

Peng et al., Document Image Template Matching based on Component Block List, Google 2001, pp. 1033-1042.*

Banville et al., Openedge Multi-Tenancy Overview, Progress Software Corporation 2012, pp. 1-29.*

* cited by examiner

PROVIDING A QUOTE TEMPLATE IN A MULTI-TENANT DATABASE SYSTEM ENVIRONMENT

CLAIM OF PRIORITY

This application claims the benefit of U.S. Provisional Patent Application 61/349,709 entitled "METHODS AND SYSTEMS FOR PROVIDING A QUOTE TEMPLATE IN A MULTI-TENANT DATABASE SYSTEM ENVIRONMENT" by Ahuja et al., filed May 28, 2010, the entire contents of which are incorporated herein by reference, and this application claims the benefit of U.S. Provisional Patent Application 61/312,617 entitled "METHOD FOR REPRESENTING GRID-BASED LAYOUT DATA" by Moses, filed Mar. 10, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to providing a document template for creation of an electronic document with data from a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The retrieval of accurate information and subsequent delivery of this information to the user system in a manner that is easy to understand, such as in an electronic document, is desirable.

Unfortunately, conventional database approaches might not provide a way for users to configure the design of their own electronic documents generated with the data, and then dynamically render the document based upon the user design. Accordingly, it is desirable to provide techniques enabling a configurable electronic document definition with data from the database system, and/or dynamically render the document.

BRIEF SUMMARY

In accordance with embodiments, there are provided methods, computer readable mediums, systems, and apparatuses for providing a quote template in a multi-tenant database system.

In a method, system, and computer-readable medium having instructions for providing a quote template in a multi-tenant database system, information on a selection of a first database object is received for use in creation of a document template, representations for one or more database fields related to the first database object are displayed on a user interface and a database field related to the first database object has a database field of the first database object or a second database object related to the first database object and a representation of the database field may be selected on a layout for one or more documents that can be created with the document template, information is received on the layout of a document to be created with the document template and the layout of the document template has one or more selected database fields related to the first database object, and rendering information is generated for the document with information on the layout in the document template in a target format.

While one or more implementations and techniques are described with reference to an embodiment in which providing a quote template in a multi-tenant database system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
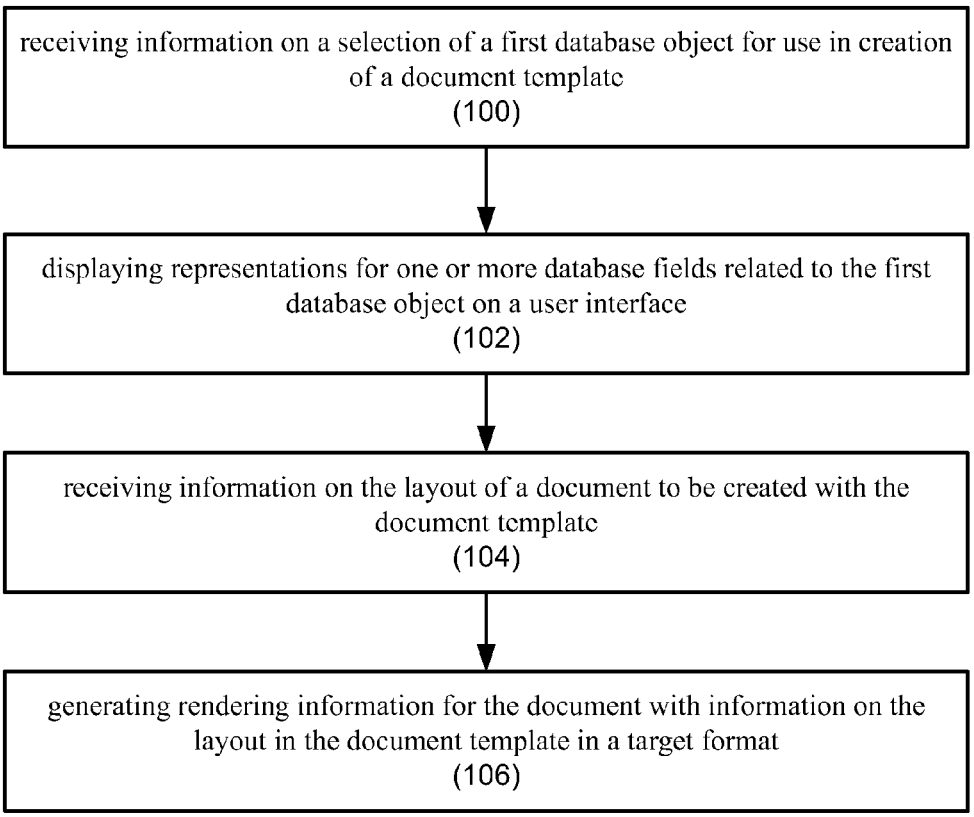
FIG. 1 illustrates an example of a simplified flow diagram for an embodiment of providing a quote template in a multi-tenant database system environment.

Systems, methods, computer readable mediums with instructions, and computer program products are provided for a document template in a multi-tenant database system environment. In one or more embodiments, a configurable document template is created for the output of an electronic document. It may be desirable to have a declarative way to create and define one or more documents in a document template and dynamically render an electronic document using the definition in the document template.

A user interface may provide a visual template editor to define the layout of a document that may be created with the document template. Embodiments may provide a visual template editor user interface that allows a user to design a WYSI-WYG (What you see is what you get) layout for a document for the document template with the user interface and the document may be rendered with the definition in the document template.

In an embodiment, a drag-and-drop and point-and-click user interface on a webpage may be used to configure or design the layout of the document template. The document template may provide the ability for the user to define document elements, including, but not limited to: sections, fields, lists of data, or any other document element that the user may want to display on the electronic document. The template editor is capable of receiving inputs from multiple sources to create the document template and the document template layout information can be stored in any format (e.g. within the database, xml, etc). For example, the user may use the template editor and/or provide a file as input to define the document template. In one or more embodiments, a document template may be built with one or more existing document templates.

The layout information or metadata for the layout may be used to construct an electronic document. In a preferred embodiment, the electronic document has information from database objects for database entities in a CRM (Customer Relationship Management) system, such as a document representing information from a "Quote" database object. A database object may represent the data in one or more database tables for a particular database entity (e.g. a Quote entity). For example, a CRM database may include a database table that describes a customer with fields for basic contact information such as name, address, phone number, fax number, etc. Another database table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Quote, and Opportunity data, each containing pre-defined database fields.

As used herein, "database object" may be construed broadly to be metadata about database fields and data from database fields from database tables and related database tables for a database entity. In a relational database, a database entity may be one or more database tables or views. In an object database, the database entity may map to object classes. Although examples provided throughout may refer to an entity as a database table, those skilled in the art will recognize that there are various ways an entity of a database design may be implemented.

The electronic document could be produced in one or more electronic formats, such as Portable Document Format (PDF), Microsoft Excel™, Microsoft Word™ and/or any other document format. Although a target electronic format of a PDF may be used in examples throughout, those with skill in the art will recognize that any target format for an electronic document may be used for implementations of providing a document template. In a preferred embodiment, the document template may be utilized to create portions of the document in an intermediate format before being sent to a conversion module to be converted to the target format. For example, the layout information for a document element may be used to create the document element in Hypertext Markup Language (HTML) and the HTML for the document element may be streamed to a conversion module to PDF. In another embodiment, the layout information stored in a database may be used directly to create the PDF.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for providing a quote template in a multi-tenant database system environment will be described with reference to example embodiments. FIG. 1 illustrates an example of a simplified flow diagram for an embodiment of providing a quote template in a multi-tenant database system environment.

Information may be received on a selection of a first database object for use in creation of a document template (100). A user interface may be provided for the selection of the first database object for use in creation of a document template. In other embodiments, a file, a database table, a queue, a script or any other method may be used to input selection information.

The database object is an encapsulation of the data within database tables and related database tables for an entity. The database object may have functions or methods to access the underlying data values for a particular instance of the database object. Database fields of one or more database tables for a database entity may be mapped to the data attributes encapsulated in the database object. In an embodiment, the database fields for a data row of a database table for an entity may map to the attributes of a database object.

In some embodiments, references and/or data from related database objects and/or database tables of a database object may be encapsulated in the database object. For example, a first database table may have a foreign key for a second database table and has a foreign key relationship with the first database table. Continuing with the example, a reference to a database object for the related database table may be accessible from the database object for the first database table. In another example, the accessible database fields of a related database table may be stored directly into attributes of the database object.

A user may select the first database object for an entity using the user interface. In a preferred embodiment, the database object may be selected from a drop down menu on a webpage or a text input selection for the name of the object. Although a webpage interface with a point-and-click interface is described, those with skill in the art will recognize that a variety of user interface may be used to receive selection information. For example, a touch screen user interface may be used on a mobile device to input selection information.

The representations for one or more database fields related to the first database object may be displayed on the user interface (102). A database field related to the first database object may be a database field of the selected first database object and/or a second database object for a database table or entity related to the selected first database object. In an embodiment, introspection may be used on a JAVA class for a database object to determine the database fields related to the database object. In another embodiment, the database fields for a database object may be determined directly from the database. In a preferred embodiment, information on the database fields for a database object is retrieved from a Metadata database table for the database object.

The representations of the database fields may appear as buttons in an embodiment on a webpage of a user interface. The representations may be displayed with the name of the database field or related database table and/or entity to the selected first database object. The representations of the database field may be selected for creation of a layout for one or more documents that may be created with the document template.

In an embodiment, the representations for database fields related to the first database object displayed on the user interface may be dragged and dropped onto a layout depicted on the web page. For example, a representation of a list may be placed on the layout to indicate that the data rows of the "Quote Line Items" database table with a foreign key relationship to a data row of the "Quote" database table may be placed onto the layout in the form of a list. Continuing with the example, a document created with the document template with the representation of a list of "Quote Line Items" on the layout may have the values for the "Quote Line Items" (e.g. data for data rows with a foreign key for a particular Quote_id) for an instance of a database object for the "Quote" database table (e.g. a database object with the data encapsulated for a data row in the Quote database table). In another example, a representation for a database fields for the "Quote" may be placed directly on the layout and the value for the database field will be printed on the document in the target formula.

In one or more embodiments, information on the layout of the selected database fields on the document template may be stored in a database, a file, a directory structure, or any other collection of data. Layout information may be stored for each document element on the document template. Information on the layout of a document element with a selected database field related to the database object may be stored with layout information, including, but not limited to: a document part, a row coordinate, a column coordinate, a document section, section style information, and identification information for a selected database field related to the database object for display of the value for the selected database field related to the database object on a document created with the document template. Document parts may include, but are not limited to, header, body, footer, or any other document part. The sections may be defined by a name and an enumerated type to indicate the order of the sections on the document. Identification information for a database field may be a reference to the database field in the database table and/or a database object. Section style information may include, but is not limited to, the following: left-justified text, right-justified text, font, margin, highlighting, or any other style information.

In a preferred embodiment, information on the layout of each document element with the selected database fields on the document template may be stored as a layout summary in a database system using a coordinate system. For example, the information for the layout of a database field of the "Quote" database table may be stored as follows: a document part coordinate of the enumerated type value for "Body," a row coordinate of "0" for the first row of the document section, a column coordinate of "1" for the second column of the document section, and a document section of "0" for the first section in the document part "Body."

In an embodiment, a rich text area using a Microsoft Rich Text Format (RTF)™ format may be defined on the document template. An editor, such as the CKSource CKeditor™, may be used to create the rich text area. The user interface may have a representation to drag and drop the editor onto the layout for editing the rich text area.

Information may be received on the layout of a document to be created with the document template (104). The layout in the document template may have one or more selected database fields related to the first database object displayed on the user interface in a template editor. For example, the layout may be displayed on visual template editor on a webpage implemented using a Hypertext Markup Language (HTML) and JavaScript™.

The information on the layout may be received from the user interface and stored in a database. The stored information on the layout and a primary key for a data row in a database table for the database object may be used to generate the electronic document in the target formula. For example, a "Quote_id" primary key of the database table "Quote" may be used to generate a document with the document template for the particular Quote.

Rendering information may be generated for the document with information on the layout in the document template in a target format (106). Renderers may be created to generate the document in the target format with the layout information. In an embodiment, an identifier or primary key for a particular database object may be provided to generate an electronic document in the target format with the document template. For example, a primary key for a particular Quote database object may be provided to generate an electronic document for the Quote. In an embodiment, the particular database object may be an instance of a Java class for the first selected database object and the values for the attributes of the database object may be retrieved with the identifier or primary key for the particular database object.

In a preferred embodiment, the renderers may use the layout information to generate a document in an intermediate format (e.g. HTML) and use the HTML document to generate a document in the target format (e.g. a PDF). In the preferred embodiment, renderers may create an HTML file with the layout information and Visualforce™ may take a HTML file or portion of HTML file as input to produce a PDF file with the HTML. In an embodiment, the renderer may be written in JAVA™ and APEX™. The HTML document may be inputted as a file to Visualforce™ and/or portions of the HTML may be streamed as input to Visualforce™.

The data on the layout for the document template may be retrieved from a database, an XML file, or any other collection of data to create a document in the intermediate format and used by the renderers to create a document in the target format. The data for the document in the intermediate format may be streamed to Visualforce™ and the output from Visualforce™ of each portion may be printed to an electronic document in the target format. In another embodiment, data on the layout may be retrieved and used to create the electronic document in the target format directly with the renderers. For example, the data on the document layout and values for the database fields on the document may be retrieved and used to create a PDF file directly.

Figure 2:
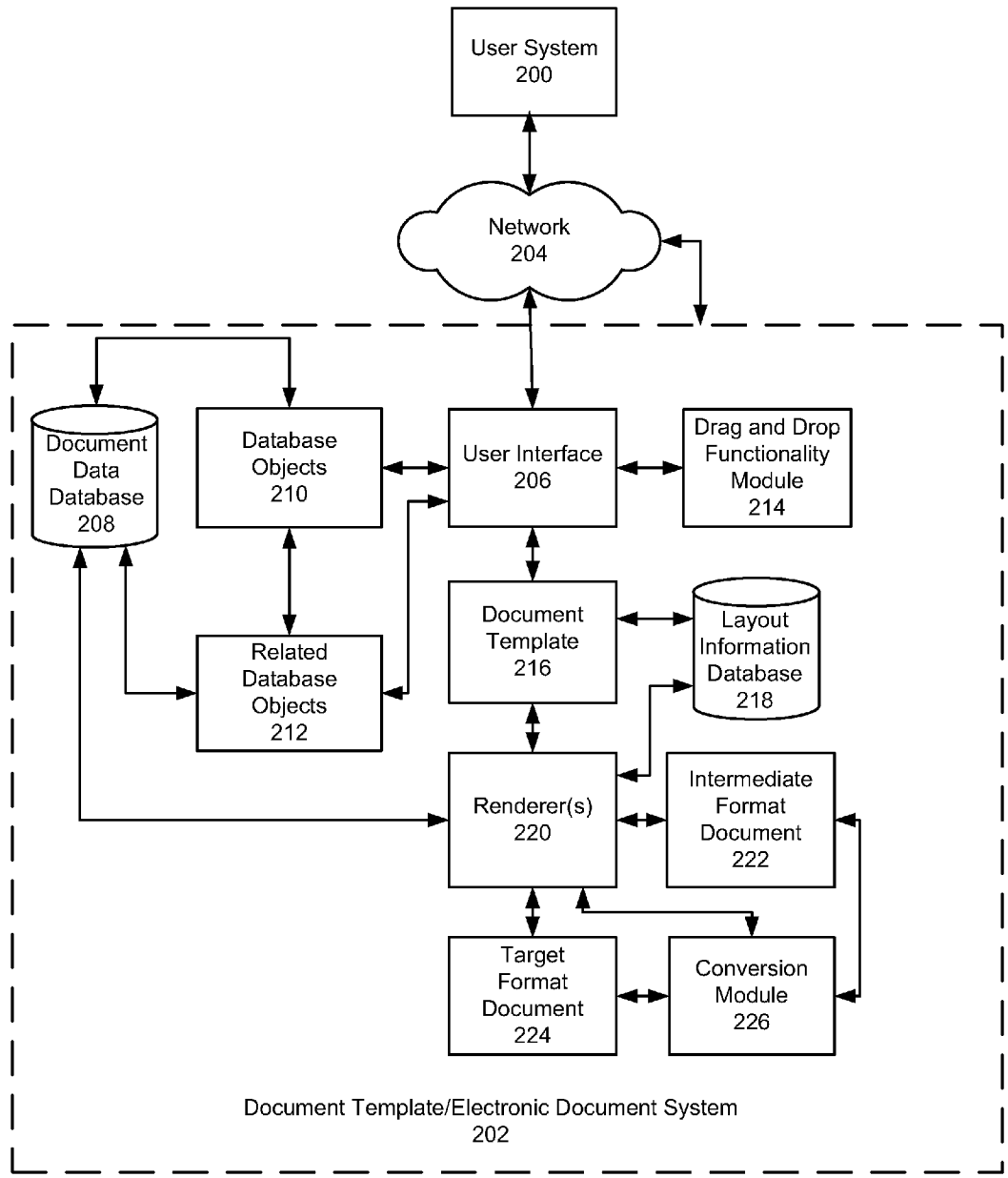
FIG. 2 illustrates a block diagram for an embodiment of providing a quote template in a multi-tenant database system environment.

FIG. 2 illustrates a block diagram for an embodiment of providing a quote template in a multi-tenant database system environment. In FIG. 2, User System 200 interacts with a Document Template/Electronic Document System 202 according to an embodiment. As will be appreciated by those skilled in the art, the functional elements of the Document Template/Electronic Document System 202 as illustrated in FIG. 2 are provided as an example, and various implementations of the system may have subsets of the functional elements and/or subsets may be distributed among various computer systems. In one or more embodiments, the Document Template/Electronic Document System 202 may be a server servicing requests sent by a user using the User System 200 over the Network 204. In another embodiment, the Document Template/Electronic Document System 202 may be a stand-alone application on a computer system.

A User System 200 may include, but is not limited to, a mobile device, a smart phone, an Apple iPhone™, a cellular phone, a BlackBerry® device, a personal digital assistant (PDA), a mp3 player, a laptop, a computer, a telephone, User System 712 described below, or any other type of computer system. A Network 204 is an infrastructure for sending and receiving signals and messages according to one or more formats, standards, or protocols. The Network 204 may provide for both wired and wireless communication between the various elements of FIG. 2. Embodiments may rely on a Network 204 for communication between elements as depicted, including, but not limited to, the following: the User System 200, a User Interface 206, a Document Data Database 208, one or more Database Object(s) 210, one or more Related Database Object(s) 212, a Drag and Drop Functionality Module 214, a Document Template 216, a Layout Information Database 218, one or more Renderers 220, an Intermediate Format Document 222, a Target Format Document 224, and a Conversion Module 226.

As illustrated in FIG. 2, a user may interact with the Document Template/Electronic Document System 202 using the User Interface 206. In one or more embodiments, the User Interface 206 may be a webpage that can be accessed through a web browser on the User System 200 and provided on the display of the User System 200. The User Interface 206 may provide an editor, such as a visual editor, for the creation of the Document Template 216. The User Interface 206 may utilize the Drag and Drop Functionality Module 214 to allow a user to drag and drop elements of the User Interface 206 in order to specify the document parts, sections, style, and other portions of document elements to include in the Document Template 216. In a preferred embodiment, the Salesforce™ Page Layout Editor drag and drop software library may be used to implement dragging and dropping of representations onto canvases of a layout within the User Interface 206.

Although drag and drop functionality is depicted in FIG. 2 as an example, those with skill in the art will recognize there are various user interface methods for permitting a user to communicate selections for the document elements on the Document Template 216. Embodiments may allow a user to interact with the Document Template/Electronic Document System 202 using point-and-click, touch with a touchscreen, use of a file as input of user selections, or any other functionality that a user can communicate selections for the system. In one or more embodiments, the User Interface 206 may be a part of UI 830 accessible from an Application Server 800, described in further detail below with FIG. 7. Personalization may be provided for the User Interface 206 to ensure that personal preferences for the user are provided on the user interface. For example, the user may consistently utilize particular database objects for documents and the favored database objects may be prominently displayed on the user interface.

The User Interface 206 provides the ability for the user to select data to display on the document, select document elements, and create a layout for documents to be created with the Document Template 216. The user can select data from the Document Data Database 208 to display on documents created with the Document Template 216. A database is any collection of data that may be stored and queried for retrieval of the stored data. Implementations of a database include, but are not limited to, relational databases, object-oriented databases, and file systems. The database may have a database server or a database management system for receiving requests and sending responses to requests for the database, such as query requests. In some embodiments, a query language may be used to query the database and produce a query result. For example, the query language SQL may be used to query a database and produce a query result set. In another embodiment, the data may be stored in a file system and a command may be executed to find or search the data within the file system. In a preferred embodiment, the Document Data Database 208 is a multi-tenant database.

The user may select one or more Database Object(s) 210 for retrieval of data from the Document Data Database 208 to be displayed on the document created with the Document Template 216. The database object is an encapsulation of the data within database tables and related tables for an entity. Database fields of one or more database tables for a database entity may be mapped to the data attributes encapsulated in the database object. The Database Object(s) 210 selected may have Related Database Object(s) 212. For example, a primary key for the Related Database Object 212 may be stored in the Database Object 210 to indicate the relationship. The database fields from the Related Database Object 212 may be retrieved using the primary key for the Related Database Object 212. The database fields accessible with the Database Object 210 either as part of the database table for the database entity of the Database Object 210 or database fields accessible with a foreign key provided in the Database Object 210 (e.g. primary key for Related Database Object 212 stored in database table for Database Object 210) may be selected by a user for the Document Template 216. Security may be maintained to ensure that database fields and data values for the database fields displayed on the User Interface 206 are accessible to the user and/or tenant.

The database fields for the Database Object 210 and the Related Database Objects 212 may be used to create a Document Template 216. The database fields may be selected for a Document Template 216 and the values for the database fields may be displayed on an electronic document created with the Document Template 216. The Document Template 216 may provide the ability for the user to define a layout for documents created with the Document Template 216. The Document Template 216 may allow for defining document parts, such as the header, body, and footer of the document. The document can be further divided into sections that are defined by the user. The sections of the document can have database fields, rich text areas, and lists of database fields from data rows of database tables accessible with the Database Object 210 (e.g. database fields of the Database Object 210 or Related Database Objects 212).

The layout of a document as defined by the user in the Document Template 216 may be stored in the Layout Information Database 218. The layout information may be retrieved by one or more Renderer(s) 220 to create a document in accordance with the Document Template 216 in the Target Format 224.

In an embodiment, the Renderer(s) 220 may use the layout information for a Document Template 216 from the Layout Information Database 218 to generate an Intermediate Format Document 222, such as an HTML file, with the underlying database field values of the database fields specified in the Document Template 216. The Renderer 220 may receive a primary key or identifier for a particular Database Object 210 to retrieve the underlying database values for the database fields specified in the Document Template 216 and a primary key for the table with the layout information. For example, a primary key or identifier for a particular Quote may be provided to access the underlying database fields for the particular Quote. A Conversion Module 226 may be used by the Renderer(s) 220 to generate the Target Format Document 224 from the Intermediate Format Document 222. In a preferred embodiment, the Conversion Module 226 is Visualforce™ and HTML may be generated as an intermediate format and used to create a PDF.

Figure 3:
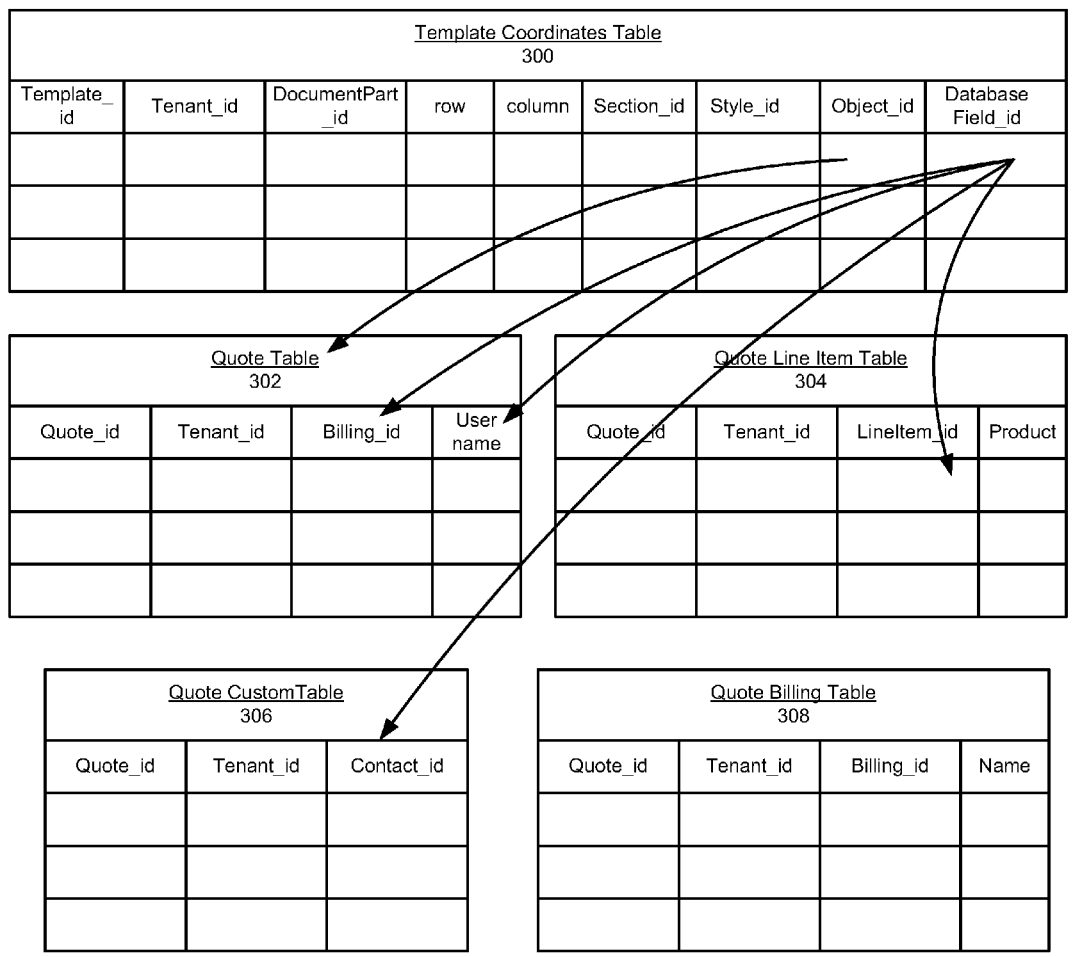
FIG. 3 illustrates an example of an implementation of entities for using an embodiment of providing a quote template in a multi-tenant database system environment.

FIG. 3 illustrates an example of an implementation of entities for using an embodiment of providing a quote template in a multi-tenant database system environment. In FIG. 3, the database table Template Coordinates Table 300 is an example of a table for the layout information for a Document Template 216. The Template Coordinates Table 300 has database fields, as follows: Template_id, Tenant_id, DocumentPart_id, row, column, Section_id, Style_id, Object_id, DatabaseField_id. The "Template_id" is the primary key for the Template Coordinates Table 300 and indicates a Document Template 300 for a tenant with a tenant primary key specified in "Tenant_id" of a multi-tenant database. Each data row of Template Coordinates Table 300 may be viewed as a document element of a document created with the Document Template 216 with "Template_id."

Although not depicted, Document Template(s) 216 can be clones of other Document Template(s) 216, and optionally a parent Document Template 216 primary key "Template_id" may be stored in the Template Coordinates Table 300 with the Document Template 216 layout information. In an embodiment, the layout information for the parent Document Template 216 may first be used for to create the layout for a document, and then the child Document Template 216 changes, additions, or alterations to the document layout may be applied.

Each row of the Template Coordinates Table 300 may specify or define the layout of a document created with the Document Template 216. The "DocumentPart_id" column of the Template Coordinates Table 316 may indicate a part of the document for the layout information of the document element represented in the data row of the Template Coordinates Table 316. For example, the "DocumentPart_id" column may have an enumerated type value, such as "0" to indicate a header section of the document, a "1" to indicate the body section of a document, and "2" to indicate the footer section of the document. The "row" and "column" may be viewed as x, y coordinates for the display of data in the section. For example, the "row" with a value of "0" and "column" with a value of "1" may be a first row and second column of a section. The "Section_id" database field may specify the section within the document part. For example, a "Section_id" of "0" may indicate the layout information in the data row of the Template Coordinates Table 316 is for the first section in the document part (e.g. header, body, footer). The "Style_id" may indicate the style for the document element provided with the data row in the Template Coordinates Table 300. An enumerated type or array of enumerated types may indicate the style in the "Style_id" for the document element specified with the data row in the Template Coordinates Table 300.

The "Object_id" column may have an identifier or a primary key to indicate a type of Database Object 210. For example, the "Object_id" may be an identifier for a Quote database entity. The "DatabaseField_id" may be an identifier or key for a database field accessible with the Database Object 210 defined with "Object_id." For example, the "DatabaseField_id" may indicate "1" for the second database field accessible with the Database Object 210. The database field accessible with the Database Object 210 may be a database field or a primary key to another Related Database Object 212. For example, the "DatabaseField_id" may indicate a field of a "Quote" in the Quote Table 300, such as "Username." In another example, the "DatabaseField_id" may indicate a table related to the Quote Table 300, such as Quote Billing Table 308 as indicated with the foreign key "Billing_id" in the Quote Table 300. The Database Object 210 for the "Quote" entity may have access to line items as defined in the Quote Line Item Table 304. The Quote table 302 may not explicitly show the relationships with columns in the Quote table 302 but the Quote Database Object 210 may encapsulate the relationships between the tables.

The Database Object 210 for the "Quote" entity may have access to custom fields for the Quote and a tenant, as shown in Quote Custom Table 306. The custom fields for a tenant may be retrieved in the example with the "Quote_id" and the "Tenant_id." A Custom Table 306 may be a table for a custom entity that may be created and/or used by a tenant to represent information. An implementation of custom entities/objects are described in U.S. patent application Ser. No. 12/764,780, entitled "Custom Entities and Fields in a Multi-Tenant Database System," filed on Apr. 21, 2010, which is incorporated herein by reference.

Figure 4:
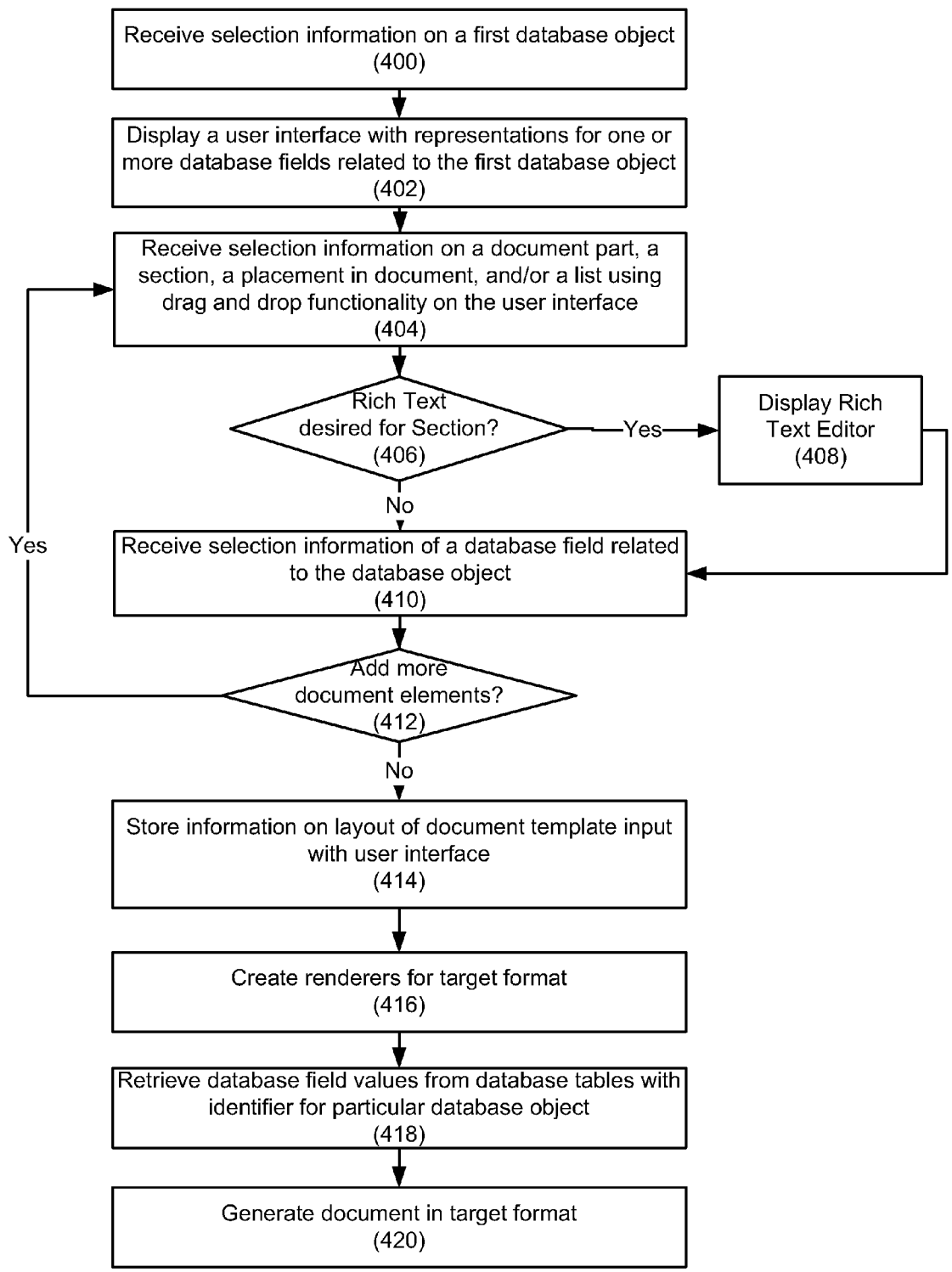
FIG. 4 illustrates an example of an operational flow for a high level overview of a technique for providing a quote template in a multi-tenant database system environment.

FIG. 4 illustrates an example of an operational flow for a high level overview of a technique for providing a quote template in a multi-tenant database system environment. Selection information on a first database object may be received (400). The first database object may encapsulate the database fields and related database objects for a database entity. The user may select the first database object for the basis of the document template that the user creates with the user interface. For example, the first database object selected by the user may be for the "Quote" entity (e.g. as depicted in FIG. 3) such that the database fields for a particular Quote (e.g. QuoteTable.Username as depicted in FIG. 3) and the database tables and/or database entities that are related to the "Quote" entity (e.g. QuoteCustomTable, QuoteLineItemTable, QuoteBillingTable as depicted in FIG. 3) are accessible for creation of an electronic document created with the document template. In an example, metadata associated with the database object may indicate relationships between database objects, such as a relationship between the first database object database table "QuoteTable" and the second database object with database table "QuoteCustomTable" in FIG. 3. In another example, foreign keys stored in a database table for the database entity may indicate the relationship between the first database object and a second database object.

The user interface may be displayed with representations for the one or more database fields related to the first database object (402). The database fields related to the first database object may be database fields of database tables used to store the information for the database entity of the first database object (e.g. QuoteTable.Username as depicted in FIG. 3), database tables that are related to the first database object (e.g. QuoteCustomTable, QuoteLineItemTable, and QuoteBillingTable as depicted in FIG. 3), and/or database fields of a second database table that is related to the first database object (e.g. QuoteLineItemTable.Product, QuoteBillingTable.Name, and ContactTable.[QuoteCustomTable.Contact_id] (where ContactTable has a primary key of the Contact_id in the QuoteCustomTable, ContactTable is not depicted) as depicted in FIG. 3). The first database object may have access to a reference to a database field related to the first database object, a reference to an accessor function of a related database object (e.g. getAttribute( ) to retrieve a database field of attribute from the related database object) and/or database field of a related database object, a data row of a database table for a database object, and/or an underlying value for a database field may be accessible with the first database object. Introspection may be performed on a JAVA class of the first database object to determine all database fields and related database objects or tables for the first database object.

The representation(s) of database fields related to the first database object on the user interface may have the database field name, the database table name for a foreign key stored in a database table of the first database object, and/or any other representation that would convey the underlying value stored in the database for the database field related to the first database object. In a preferred embodiment, the name of the database field in the database table or the related database table name may be in text on a button of a webpage. The representation may be dragged and dropped on the visual template editor on the user interface.

Selection information on a document part, a section, a placement in a document, and/or a list may be received (404). In an embodiment, the placement of the representation on the user interface using drag and drop functionality may indicate the document part (e.g. header, footer, or body), the position in the document (e.g. row and column), the section, and whether a list is desired. A list may be a set of data fields for data rows of one or more database table(s).

The user may desire a rich text area (406). The user may indicate that a rich text area is desired by dragging and dropping a symbol for the rich text area onto a section of the document template in a visual template editor. If the user desires a rich text area (406), then the Rich Text Editor is displayed (408) and the rich text selected by the user with the editor may be stored for the document template. For example, a file for a logo of a company may be indicated with the rich text area for a header document part of a document template. Next, selection information of a database field related to the database object may be received (410). Alternatively, if the rich text is not desired for the document template (406), then selection information of a database field related to the database object may be received (410).

Continuing with FIG. 4, selection information of a database field related to the database object may be received (410). The database field related to the database object may be selected on the user interface for the document element by a user and stored in a database for the layout information for the document template. Next, a determination may be made as to whether to add more document elements to the document template (412). If more document elements are desired (412), then the process may repeat with selection information on a document part, a section, a placement in a document, and/or a list being received (404).

If more document elements are not desired (412), then information stored on a layout for the document template that is input with the user interface is stored (414). The renderers may be created for the target format of the document (416). A renderer may be an instantiation of a JAVA class with a process for creating the electronic document in the target format. The target format may be selected by the user with the user interface. The renderer may be provided with an identifier for a particular first database object (e.g. a primary key for a Quote entity) and a primary key for the layout information for a document template. The identifier for the particular first database object may be used to retrieve the underlying database field values for the database object (418). The underlying database values may be used with the document layout information to create an electronic document in the target format (420).

Figure 5A:
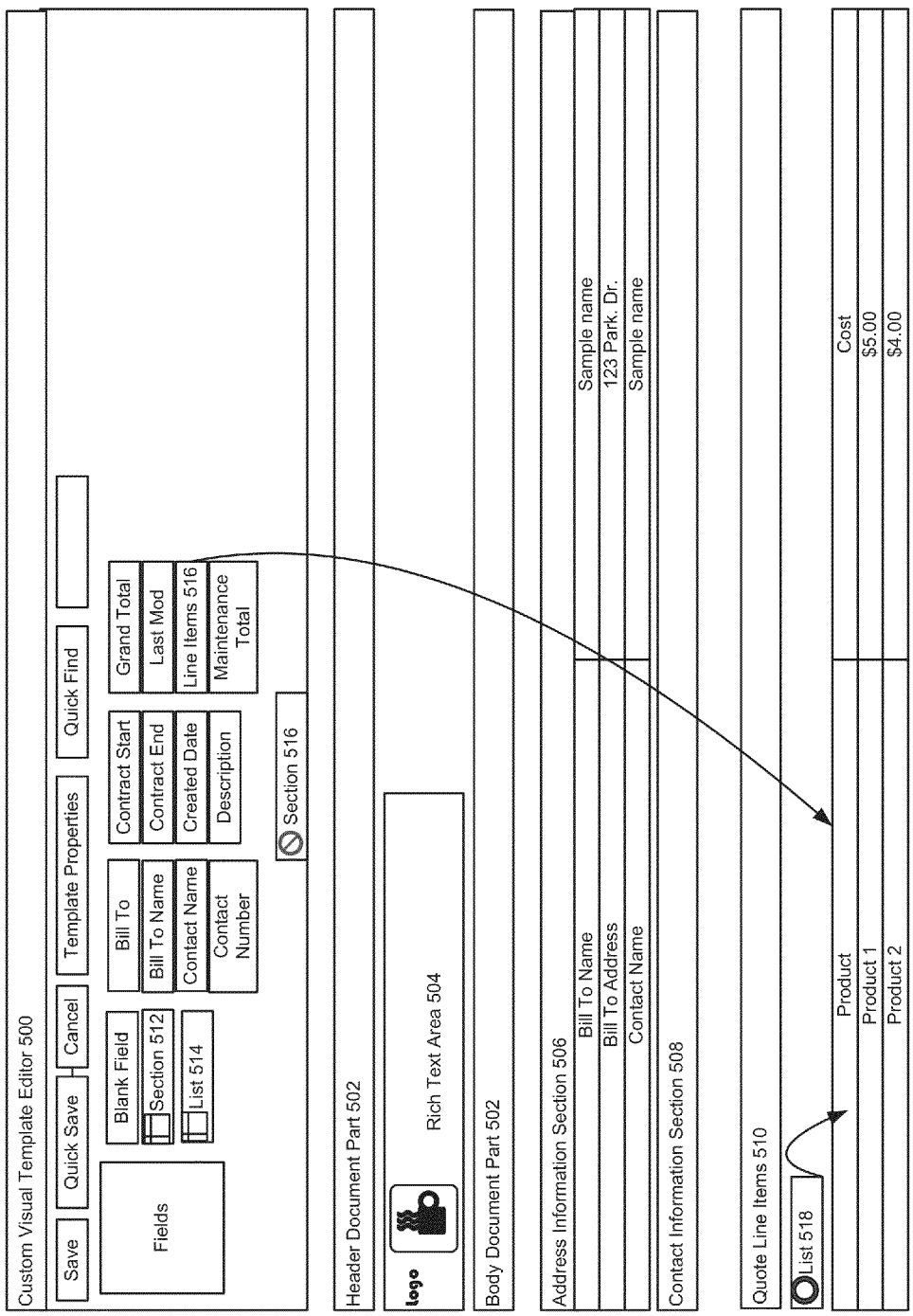
FIGS. 5A-5C are diagrams illustrating an example user interface screen supporting techniques for providing a quote template in a multi-tenant database system environment.
Figure 5B:
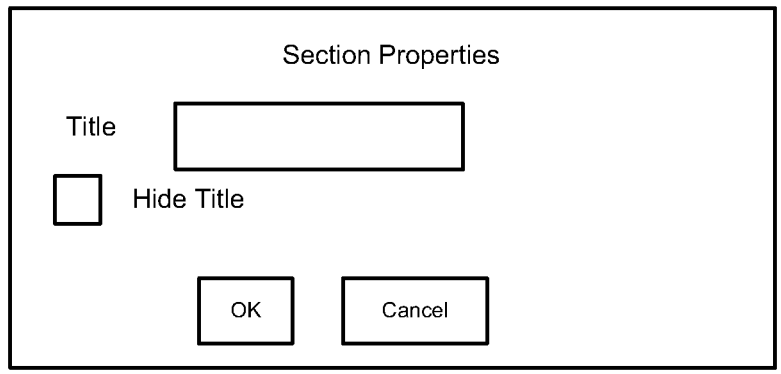
Figure 5C:
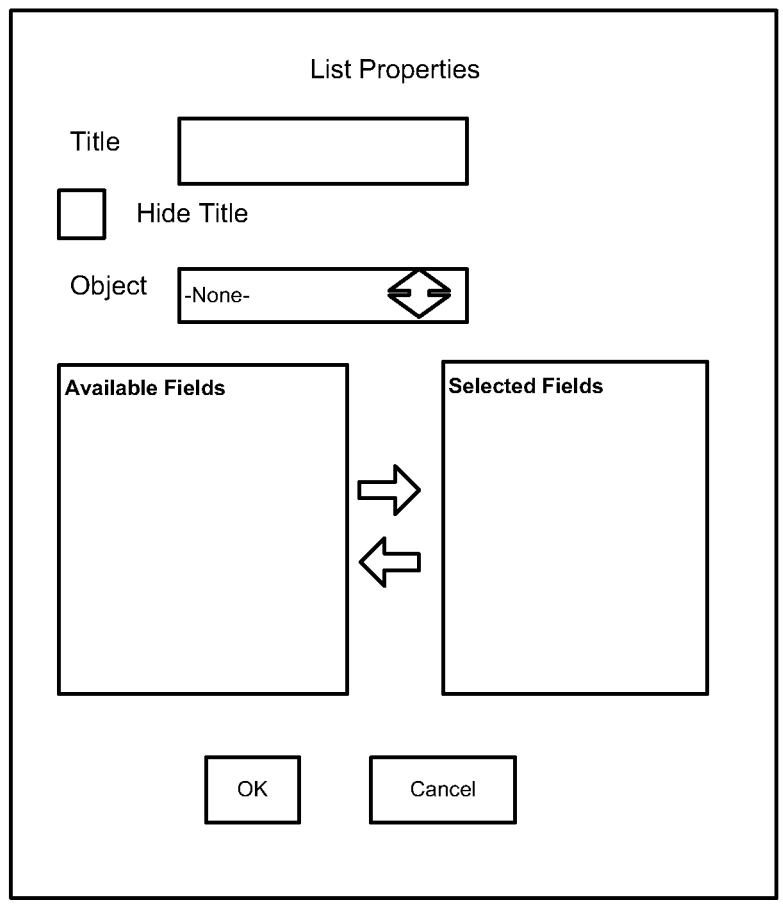

FIGS. 5A-5C are diagrams illustrating an example user interface screen supporting techniques for providing a quote template in a multi-tenant database system environment. FIG. 5A depicts an example of user interface for a visual template editor. The Custom Visual Template Editor 500 has controls on the user interface to "Save", "Quick Save", and "Cancel" the layout for the document template displayed in the Custom Visual Template Editor 500. The Custom Visual Template Editor 500 provides controls for further "Template Properties" and to directly access a database field with "Quick Find" and a text input for the database field. When a first database object is selected (e.g. Quote), then representations for the database fields related to the database object may be displayed with the controls for the Custom Visual Template Editor 500. As shown in FIG. 5A, the representations for the database fields related to the selected database object displayed are as follows: "Bill To", "Bill To Name", "Contact Name", "Contact Number", "Contract Start", "Contract End", "Created Date", "Description", "Grand Total", "Last Mod", "Line Items" 516, and "Maintenance Total."

In an embodiment, controls for "Blank Field", "Section" 512, and "List" 514 are provided. A "blank field" may allow for a user to select a document element with blank space for the document created with the document template depicted within the Custom Visual Template Editor 500. A "Section" 512 may be selected as a section document element of the document template. Examples of sections are depicted with "Address Information Section" 506, and "Contact Information Section" 508. A section may be designated by a user on the user interface by dragging and dropping the "Section" 512 representation. If the user places the "Section" 512 representation in an area that is not available for a section, then the representation will indicate that it is not allowed as depicted with "Section" 516.

A user may select a "List" 514 as a document element on the document template, and the representation may indicate that it is allowed to be placed in the area on the template as depicted with "List" 518. A list may be a set of database fields from a database table, as depicted with "Quote Line Items" 510. The "Line Items" 516 (e.g. a database field that is a database table related to the database object selected as a basis for the document template displayed) has been selected as a list, and the "Product" and "Cost" database fields of the "Line Items" 516 database table have been listed for the document.

The "Header Document Part" 502 document part has a "Rich Text Area" 504 as depicted in FIG. 5A. The "Body Document Part" 502 has an "Address Information Section" 506 and a "Contact Information Section" 508. The "Address Information Section" 506 has database fields "Bill To Name," "Bill To," and "Contact Name." The document template displayed in the Custom Visual Template Editor 500 has the underlying database field values displayed for a particular database object. In other embodiments, the underlying values of the database fields may not be displayed for the document template and the underlying values may be retrieved for generation of a document with the document template.

FIG. 5B depicts an example of an overlay for a user interface of a visual template editor that may be displayed when a "Section" 512 of FIG. 5A is placed in an available area for a section in a visual of a document template. The overlay provides for specifying a title or hiding the title.

FIG. 5C depicts an example of an overlay for a user interface of a visual template editor that may be displayed when a "List" 514 of FIG. 5A is placed in an available area for a list in a visual of a document template. The overlay provides for specifying a title or hiding the title and specifying a database object for the list of database fields to be placed in the document generated with the document template.

PDF Template Editor—Quote PDF Layout Editor

It may be desirable to allow customers to customize the look and feel of how a Quote database object electronic document is generated. In an example, the tasks can be viewed as broken up into the following components: a Visual Template Editor, Quote generation at runtime, and Quote User Interface.

Continuing with the example, the Visual Template Editor may allow a user to specify the metadata for a document template for quotes. The metadata for the quote template layout may be stored using "Summary Layouts" database tables. The "sections" in the template may be viewed and stored as "summary slices."

In an embodiment, the "Summary Layout" may be viewed as a grid. An item on the layout may have database fields for a "summary slice" including, but not limited to, the following: a z-index to correspond to the "section" for which it belongs, and an x-index for the column and y-index for the row in the grid. For example, a "z axis" value of 1 may indicate the second section on the layout. A "summary slice" may have a "slice style" database field with an enumerated type value that may define whether the title of the section is hidden or not.

In an embodiment, specific attributes related to a particular section may be stored in a "summary_layout_slice_info" database table with information on the particular position on the z axis (e.g. section). The "summary_layout_slice_info" database table can be used to store information about a particular row, column, or a section in the layout. Customization for a specific cell, column, row or a section may be stored.

A "List" can be dropped in among the field sections on the document template in the Visual Template Editor. Both the "Section" and "List" may be dropped on the same canvas. A canvas is a document part (e.g. header, body, footer). When a "List" component is dropped in the canvas (e.g. an area of the template), a different overlay may be used to configure the related list is displayed in an embodiment.

A column in the "summary_layout_slice_info" database table may be used to store which related list entity for the Quote that section belongs to (e.g. QuoteLineItem, ActivityHistory, etc.). The columns for the related list may be stored in "summary_layout_item_info" database table with the positioning of each field being stored in the X-axis (e.g. row), and the Z-axis may indicate the ordering of the section/list to which the field belongs.

In an embodiment, for database field section components, the metadata may be stored in "summary_layout_slice_info" database table and the fields may be stored with a column first (e.g. x axis) and then a row second (e.g. y axis) in "summary_layout_item_info" table. When cloning a template, the user may select a standard template to clone from and alter the template to customize the document template Quote generation may occur at runtime and the layout metadata from the quote template may used by an instantiation of a Java class to generate the html representation of the PDF and passed to Visualforce to add in the rich text areas and generate the PDF document. Two parameters may be provided to generate a quote electronic document a primary key for the particular Quote data row (e.g. quoteId) and the primary key for the summary of the layout information for the document (e.g. summlId). Summary layout information may be read from the cache if it exists otherwise the summary layout information may be loaded into memory.

In an embodiment, for each section, the type is determined and appropriate scheme to load and present the data in a desired manner is selected. For database field sections of a "Quote", in an embodiment, the "QuoteEntityObject" is loaded into memory and the primary key of the fields is used to retrieve the value for the field and display the html element in the appropriate cell for that field section. To generate the related list data, the related list may be initialized first initialized and then may be added to a batch job for performance reasons. This may ensure that one roundtrip is made to the database to get all the related list data. While processing the related list database result set to display each individual cell, each individual data row may be retrieved, and each of the database fields in the row may be used to create the HTML elements for display.

The HTML document may provide how quote data should be displayed and respect the correct ordering of the sections as well as the database fields. In an embodiment, the HTML file may then passed on to the Visualforce™ and the document in the html may be generated as a PDF when displayed to the end user.

In an embodiment, a menu button on a Quote User Interface may be provided which may list the last five quote templates used by the user and an option to choose which template to use to generate the PDF. Entry to the user Most Recently Used list (MRU) is provided in an embodiment the moment a Quote PDF which used a document template is saved.

System Overview

Figure 6:
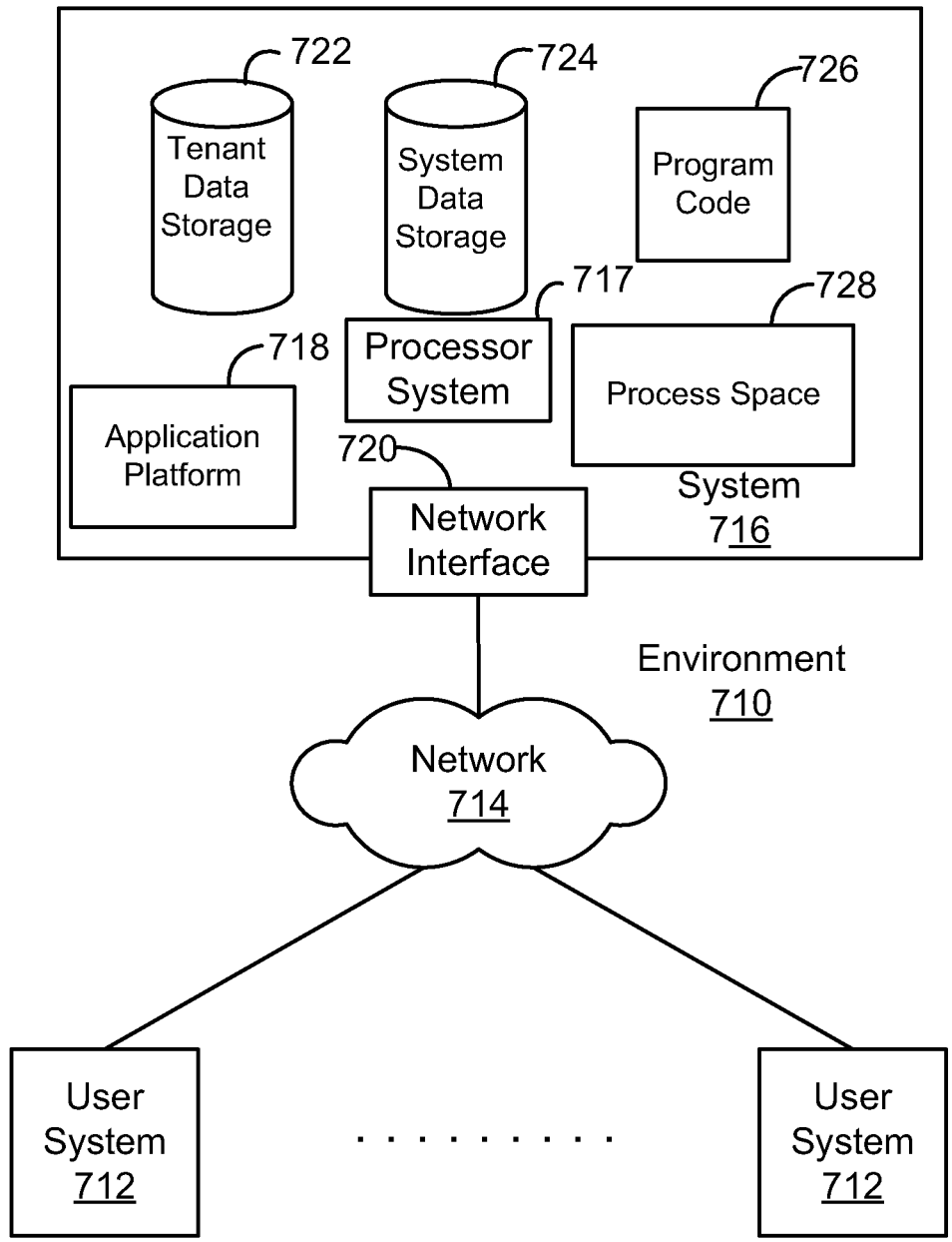
FIG. 6 illustrates a block diagram of an example of an environment wherein an on-demand database service might be used.

FIG. 6 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 6 (and in more detail in FIG. 7) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 6, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 6, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 6 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
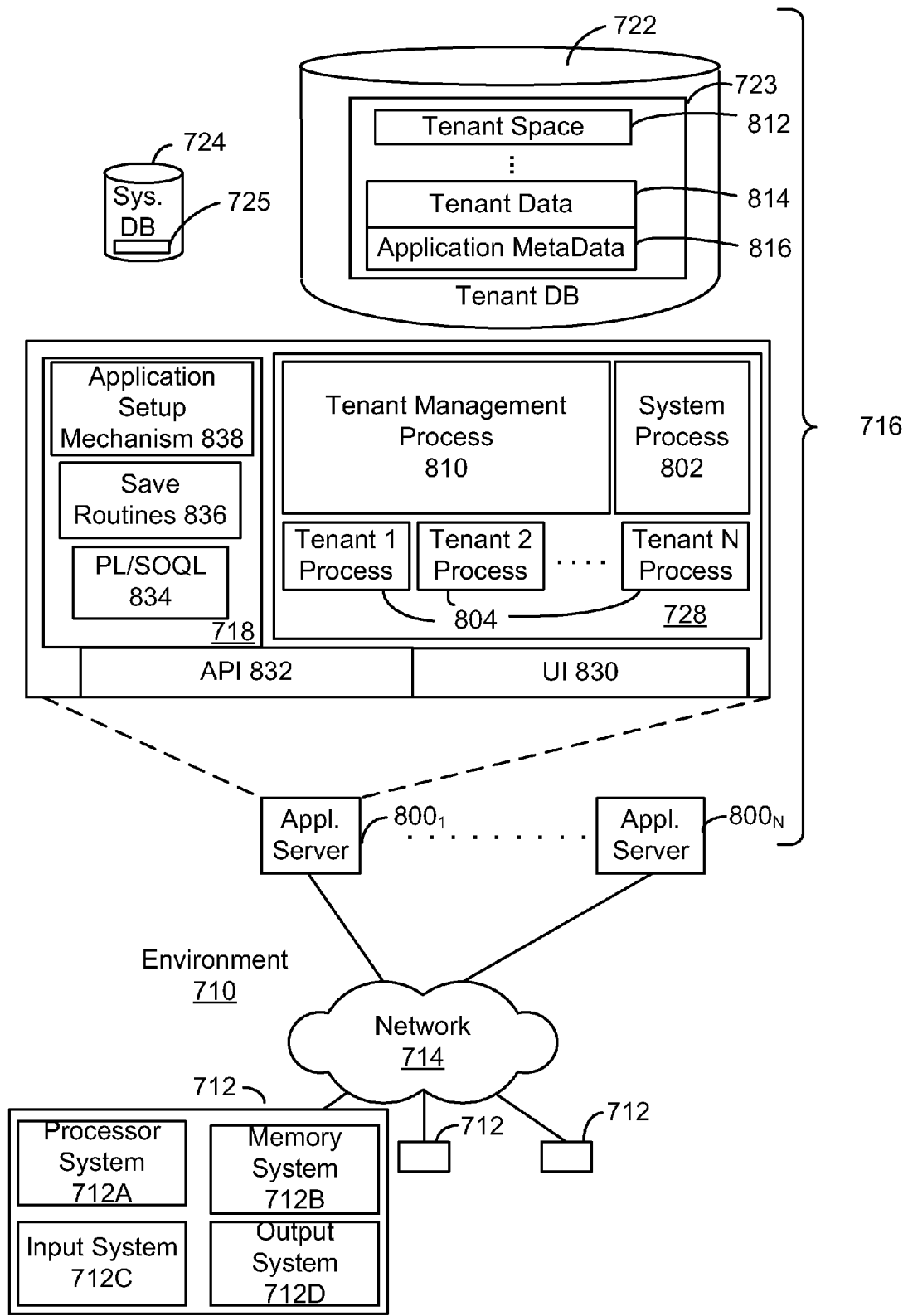
FIG. 7 illustrates a block diagram of an embodiment of elements of FIG. 6 and various possible interconnections between these elements.

FIG. 7 also illustrates environment 710. However, in FIG. 7 elements of system 716 and various interconnections in an embodiment are further illustrated. FIG. 7 shows that user system 712 may include processor system 712A, memory system 712B, input system 712C, and output system 712D. FIG. 7 shows network 714 and system 716. FIG. 7 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800₁-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 6. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 7, system 716 may include a network interface 720 (of FIG. 6) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
receiving input indicating a selection of a first database object to be used in creating a document template in a multi-tenant database system;
retrieving a list of database fields related to the first database object;
generating a graphical representation for each database field in the list of database fields retrieved from the first database object, the graphical representation for each of the database fields forming at least a part of the document template;
displaying, in a user interface, the graphical representation for each database field related to the first database object;
storing layout information of one or more selected graphical representations of one or more database fields in the document template in the multi-tenant database system; and
rendering a document in a target format using the layout information in the document template.

2. The method of claim 1, wherein the layout information for a document element comprises at least one of a document part, a row coordinate, a column coordinate, a document section, and identification information for a selected database field related to the first database object for display of a value for the selected database field related to the first database object in the document.

3. The method of claim 2, wherein the layout information for a document element comprises a document part designation of at least one of a header, a body, and a footer.

4. The method of claim 1, further comprising:
providing an identifier for a particular database object and an identifier for the layout information of the document template;
generating rendering information for at least a portion of the document in an intermediate format using the layout information in the document template; and
providing at least the portion of the document in the intermediate format to a conversion module to generate at least a portion of the document in the target format.

5. The method of claim 1, further comprising:
providing a rich text editor for creation of rich text area in the document template.

6. The method of claim 1, wherein the first database object has a database field that refers to a second database object related to the first database object, and wherein the database field has a reference to a foreign key for a database table of the second database object related to the first database object.

7. The method of claim 1, wherein the user interface is a visual template editor.

8. The method of claim 1, further comprising:
receiving input indicating the selected graphical representation of a database field;
receiving input indicating layout information generated from at least one drag and drop action performed on the selected graphical representation, wherein the forming the document template is based on the input indicating the selected graphical representation and the layout information.

9. The method of claim 1, further comprising:
generating an intermediate format document based on the document template, the intermediate format document being usable for forming the document in the target format.

10. The method of claim 1, wherein the rendering the document in the target format comprises rendering, at runtime, values in the document that are stored in a database and that relate to the database fields associated with the selected graphical representations.

11. A computer-readable storage medium having one or more instructions thereon for providing a quote template in a multi-tenant database system, the instructions when executed by one or more processors causing the one or more processors to carry out:
receiving input indicating a selection of a first database object to be used in creating a document template in a multi-tenant database system;
retrieving a list of database fields related to the first database object;
generating a graphical representation for each database field in the list of database fields retrieved from the first database object, the graphical representation for each of the database fields forming at least a part of the document template;
displaying, in a user interface, the graphical representation for each database field related to the first database object;
storing layout information of one or more selected graphical representations of one or more database fields in the document template in the multi-tenant database system; and rendering a document in a target format using the layout information in the document template.

12. The computer-readable storage medium of claim 11, wherein the layout information for a document element comprises at least one of a document part, a row coordinate, a column coordinate, a document section, and identification information for a selected database field related to the first database object for display of a value for the selected database field related to the first database object in the document.

13. The computer-readable storage medium of claim 12, wherein the layout information for a document element comprises a document part designation of at least one of a header, a body, and a footer.

14. The computer-readable storage medium of claim 11, the instructions further comprising:
   providing an identifier for a particular database object and an identifier for the layout information of the document template;
   using the layout information in the document template; and
   providing at least the portion of the document in the intermediate format to a conversion module to generate at least a portion of the document in the target format.

15. The computer-readable storage medium of claim 11, the instructions further comprising:
   providing a rich text editor for creation of rich text area in the document template.

16. The computer-readable storage medium of claim 11, wherein the first database object has a database field that refers to a second database object related to the first database object, and wherein the database field has a reference to a foreign key for a database table of the second database object related to the first database object.

17. The computer-readable storage medium of claim 11, wherein the user interface is a visual template editor.

18. A system, the system comprising:
   a processor; and
   one or more stored sequences of instructions which, when executed by the processor, cause the processor to carry out:
      receiving input indicating a selection of a first database object to be used in creating a document template in a multi-tenant database system;
      retrieving a list of database fields related to the first database object;
      generating a graphical representation for each database field in the list of database fields retrieved from the first database object, the graphical representation for each of the database fields forming at least a part of the document template;
      displaying, in a user interface, the graphical representation for each database field related to the first database object;
      storing layout information of one or more selected graphical representations of one or more database fields in the document template in the multi-tenant database system; and
      rendering a document in a target format using the layout information in the document template.

19. The system of claim 18, wherein the one or more stored sequences of instructions which, when executed by the processor, cause the processor to further carry out:
   wherein the layout information for a document element comprises at least one of a document part, a row coordinate, a column coordinate, a document section, and identification information for a selected database field related to the first database object for display of a value for the selected database field related to the first database object in the document.

20. The system of claim 18, wherein the one or more stored sequences of instructions which, when executed by the processor, cause the processor to further carry out:
   providing an identifier for a particular database object and an identifier for the layout information of the document template;
   generating rendering information for at least a portion of the document in an intermediate format using the layout information in the document template; and
   providing at least the portion of the document in the intermediate format to a conversion module to generate at least a portion of the document in the target format.

21. The system of claim 18, wherein the one or more stored sequences of instructions which, when executed by the processor, cause the processor to further carry out:
   providing a rich text editor for creation of rich text area in the document template.

22. The system of claim 18, wherein the first database object has a database field that refers to a second database object related to the first database object, and wherein the database field has a reference to a foreign key for a database table of the second database object related to the first database object.

23. The system of claim 18, wherein the user interface is a visual template editor.

* * * * *